United States Patent [19]

Hamano

[11] Patent Number: 4,839,681
[45] Date of Patent: Jun. 13, 1989

[54] CAMERA ACCESSORY OUTPUT INFORMATION SYSTEM

[76] Inventor: Hideo Hamano, C-524, Dai-2 Koporasu, Kibougaoka 144-1, Nakakibougaoka, Asahi-Ku, Kanagawa-Ken, Japan

[21] Appl. No.: 125,473

[22] Filed: Nov. 25, 1987

Related U.S. Application Data

[63] Continuation of Ser. No. 925,706, Oct. 30, 1986, abandoned.

[30] Foreign Application Priority Data

Nov. 1, 1985 [JP] Japan ................. 60-243889

[51] Int. Cl.$^4$ .................. G03B 17/00; G03B 7/20
[52] U.S. Cl. ........................ 354/286; 354/289.12
[58] Field of Search ............... 354/400, 195.1, 195.12, 354/455, 286, 289.12, 295

[56] References Cited

U.S. PATENT DOCUMENTS

| 4,149,795 | 4/1979 | Sakurada et al. | 354/289.12 X |
| 4,509,842 | 4/1985 | Taniguchi et al. | 354/286 X |
| 4,540,262 | 9/1985 | Nakai et al. | 354/286 X |

FOREIGN PATENT DOCUMENTS 43620 3/1985 Japan ................. 354/400

Primary Examiner—W. B. Perkey
Attorney, Agent, or Firm—Bryan, Cave, McPheeters & McRoberts

[57] ABSTRACT

An output information system for providing preset information signals from a camera accessory (Y), such as an interchangeable lens or a stroboflash device, to a camera body (X), for use by a microprocessor in the camera body (X), employs a gate array (AN1–AN8, OR1–OR7), a counter (COUNTER 1), and a decoder arrangement (decoders 1,2) for providing an n bit stream of 1's and 0's to the microprocessor in a predetermined bit pattern synchronized to an n pulse clock stream from the camera body (X), without addressing.

2 Claims, 4 Drawing Sheets

CAMERA ACCESSORY OUTPUT INFORMATION SYSTEM

This is a continuation of U.S. application Ser. No. 925,706, filed Oct. 30, 1986, now abandoned.

BACKGROUND OF THE INVENTION

1. Field of the Invention

The present invention relates to an output information system for providing preset information signals from a camera accessory, such as an interchangeable lens or a stroboflash device, to a camera body for use by a microprocessor in the camera body without the need for addressing, and more particularly to the provision of such information signals using gate arrays.

2. Description of the Prior Art

Prior art camera systems employing microprocessors in the camera body which receive information from camera accessories, such as interchangeable lenses or stroboflash devices, for use by the microprocessor in controlling the operation of the camera are well known in the art such as, by way of example, described in British Pat. No. 1,552,597; U.S. Pat. Nos. 4,509,842; 4,477,164 and 4,560,267; and Japanese Pat. Publication Nos. 54-108628 and 59-84228. All of these prior art systems, however, employ an addressable read only memory or ROM located on the lens or accessory for storing the preset information to be sent to the microprocessor. Because of the use of a ROM, many inherent disadvatages are present in these prior art systems, such as an inherent lack of flexibility due to the fact that a ROM by its very nature is unique to a given microprocessor, has a data content which is inherently fixed, and is inherently discretized in its data storage. In addition, an address circuit must inherently be employed with such a prior art ROM based system whether the addressing is done by the camera body or ultimately by the accessory, since a ROM requires an address and a table look-up function in order to obtain the data stored at a particular fixed location in memory. Furthermore, a ROM inherently requires a long lead time in manufacture and is costly to produce. These disadvantages of the prior art ROM systems are overcome by the gate array based system of the present invention.

In addition to the aforementioned prior art ROM based systems, there have been prior art camera systems which employ simple switches to provide digital information to a microprocessor for use by the microprocessor, such as disclosed in U.S. Pat. Nos. 4,104,649; 4,426,147 and 3,428,858; however, none of these prior art systems is capable of readily providing the sophisticated information that the gate array based system of the present invention can while, thus, providing many of the benefits of ROM based systems without providing any of the disadvantages, operating in a totally different manner.

As disclosed in Japanese Pat. Publication No. 54-108628 and U.S. Pat. No. 4,560,267, by way of example, clock pulses are sent from the camera body microprocessor to the lens in order to cause an address to be generated by the lens to obtain data fixedly stored in the ROM with the data then being sequentially output serially back to the microprocessor. In the present invention, although clock signals sent from the microprocessor are utilized and information is serially sent back to the microprocessor, there is no generation of addresses, nor is there any address function employed. Rather, each clock pulse in an n-bit clock stream is sequentially employed either directly or indirectly in the gate array to provide a 1 or 0 bit output from the accessory to any microprocessor irrespective of its program language based solely on a predetermined bit pattern. Thus, the gate array based system of the present invention is not dependent on a given microprocessor, may have its bit pattern output varied, does not employ addressing and is less costly and quicker to produce than prior art ROM based systems.

SUMMARY OF THE INVENTION

An output information system for providing preset information signals from a camera accessory(Y), such as an interchangeable lens or a stroboflash device, to a camera body(X), for use by a microprocessor in the camera body(X), employs a gate array (AN1-AN8, OR1-OR7), a counter(COUNTER 1), and a decoder arrangement (decoders 1,2) for providing an n bit stream of 1's and 0's to the microprocessor in a predetermined bit pattern synchronized to an n pulse clock stream from the camera body(X), without addressing.

DETAILED DESCRIPTION OF THE INVENTION

Figure 1:
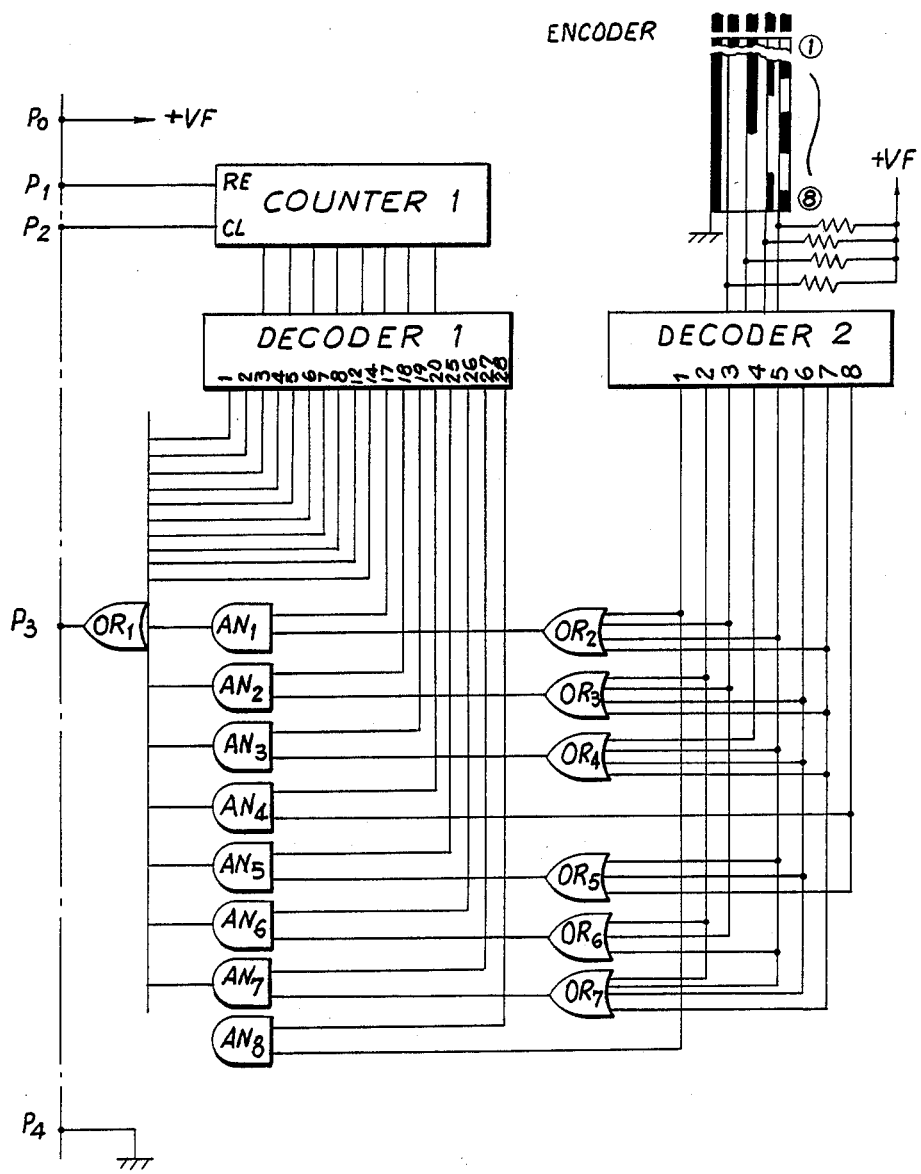
FIG. 1 is an illustrative simplified block diagram illustrating the preferred embodiment of the present invention showing a gate array based output system.

Referring to the drawings in detail and initially to FIG. 1 thereof, an illustrative block diagram of the preferred embodiment of the present invention is shown. By way of example and as shown and preferred in FIG. 1, the output system of the present invention is shown employed in an interchangeable lens, such as an autofocus lens, and preferably comprises a gate array of conventional AND(AN1 through AN8) and OR (OR1 through OR7) gates and direct output paths in conjunction with a conventional counter(COUNTER 1) and pair of decoders(DECODERS 1 and 2). This preferred gate array configuration preferably provides the desired sequential bit pattern output to the camera body, with the left side of the chain line representing camera body X and the right side the accessory or lens circuit Y in this example, via OR gate OR1 and output terminal (P3), in a serial stream of 1's and 0's.

As shown and preferred in FIG. 1, where a direct output path from DECODER 1 is provided to OR gate OR1, when this path goes high for a given clock pulse, a 1 is provided to the output terminal (P3) and when no direct path from DECODER 1 is provided for a given clock pulse, a 0 is provided. In respect to the indirect paths to OR gate OR1 from DECODER 1, these paths are provided through the AND gate array(AN1 through AN8), with DECODER 1 providing one input to a particular AND gate in the illustrated AND gate array(AN1 through AN8) and the other input to the illustrated AND gate array(AN1 through AN8) coming from DECODER 2 which preferably contains an output path for each focal length that the illustrated zoom lens of FIG. 1 can be set to, with eight such possible focal lengths being shown in FIG. 1. By way of example, different combinations of focal lengths are shown as providing the other input to the appropriate AND gate in the AND gate array(AN1 to AN8) either via OR gates OR2 through OR7 in the case of AND gates AN1 through AN3 and AN5 through AN7, or directly, as in the case of gates AN4 and AN8. Thus, the AND gates (AN1 through AN8) are only employed when information is required from the lens that is the focal length of the lens. Therefore, in order to obtain a high or 1 at the input to OR gate OR1 from gates AN1 through AN8, DECODER 1 must have a high output path to the respective AND gate (AN1 through AN8) indicating that the proper clock pulse in the n-bit or n-pulse clock stream is present and DECODER 2 must have the appropriate output path high indicating that the lens is at the associated focal length for that clock pulse. For example, if output path 1 of DECODER 2 represents a focal length of 35 mm and output path 17 of DECODER 1 represents the 17th clock pulse from the camera body received by COUNTER 1 via terminal P2 after the reset pulse is received via terminal P1, then if the zoom lens is set at 35 mm at the time of the 17th clock pulse, both inputs to AND gate AN1 will be high, the output of AN1 will then be high and a 1 will be sent to the camera body X via OR gate OR1. Similarly, by way of example, when the 7th clock pulse is present, output path 7 of DECODER 1 will go high and a 1 will be directly provided back to the camera body via OR gate OR1 and terminal P3, This procedure of highs and lows or 1's and 0's being provided by OR gate OR1 continues throughout the desired n-bit clock pulse stream for its entire length, bit-by-bit, providing a series of 1's and 0's in a real time serial bit stream of one bit for each clock pulse until the reset pulse is sent to COUNTER 1 clearing the COUNTER 1 and indicating the end of the bit stream. The cycle repeats again with the next n-bit clock pulse stream to COUNTER 1 following the reset pulse.

Figure 2:
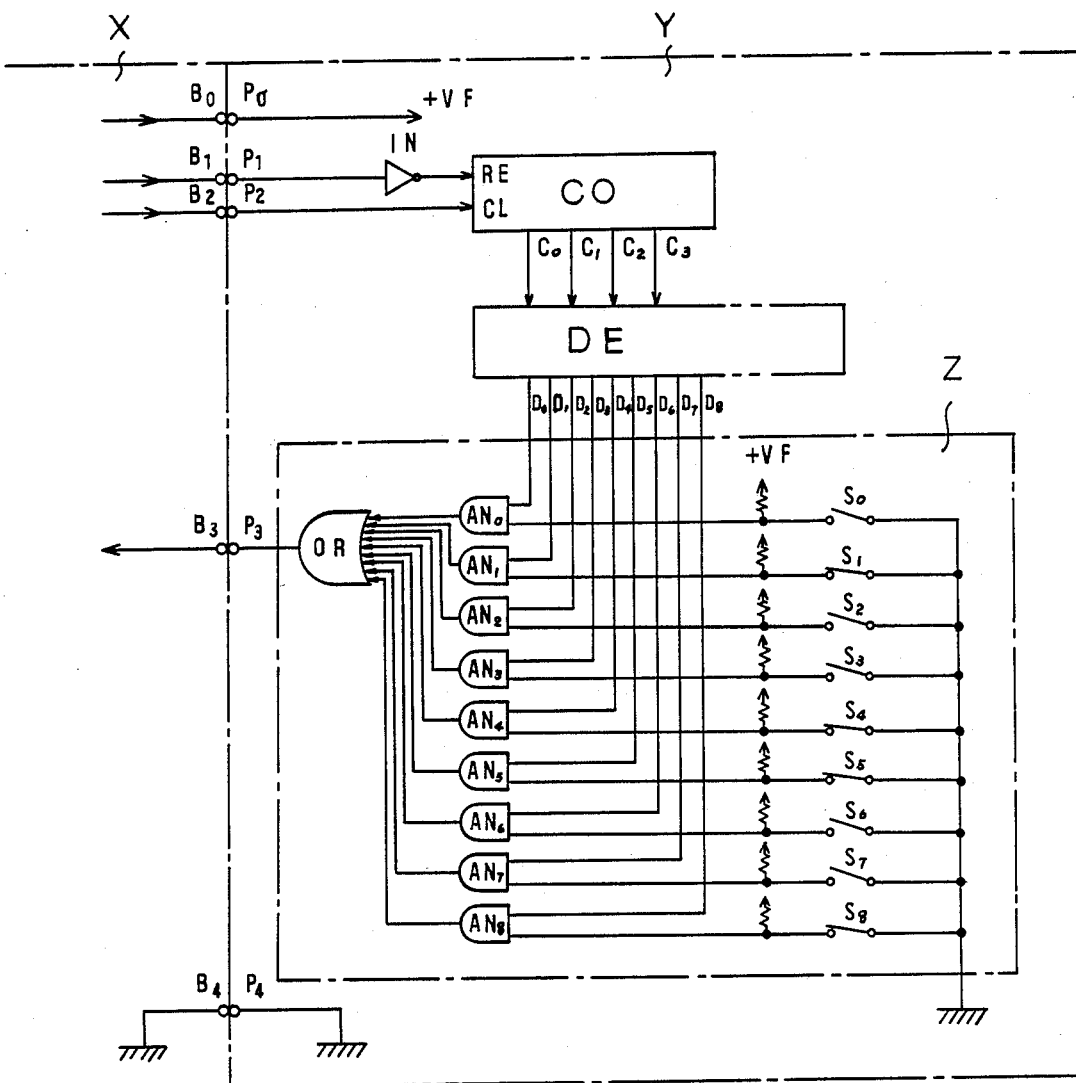
FIG. 2 is a block diagram, similar to FIG. 1, in which the second decoder shown in FIG. 1 has been replaced by a switch array.

FIG. 2 is a block diagram showing the information transmission system according to the invention for the camera accessories (interchangeable lens or stroboflash device, etc.), in which the left side of the chain line represents camera body X and the right side shows the Y side circuit for the camera accessory and in which a setting switch 2 replaces the DECODER 2 and OR gate array OR2 through OR7 of FIG. 1.

Terminal (B0) in the camera body represents the power output terminal which is connected to power input terminal (P0) in the camera accessory. Terminal (B1) in the camera is connected to reset terminal (RE) of counter (CO) through input terminal (P1) and inverter (IN) in the camera accessory.

This input terminal (P1) becomes "High" while receiving information signals transmitted from the camera accessory, leaving the counter (CO) in reset open status.

Output terminal (B2) in the camera body is connected to the terminal (CL) of the counter (CO) via terminal (P2) to transmit clock pulses from the camera body to the camera accessory in order to electrically synchronize them.

The counter (CO) is a 4 bit binary counter for counting the rising of the clock pulses entering from the input terminal (P2).

The 4 bit outputs (C0-C3) of the counter (CO) enter decoder (DE) from which signals shown in Table 1 annexed hereto as Appendix 1 are generated as outputs according to the counts of the counter (CO).

Table 1. 1; Counter 2; Decoder

Among the outputs from the output terminals (D0-D8) of the decoder (DE), only one output becomes "High" while the others select "Low" signals according to the counts of the counter (CO). The output of the counter passes setting switch means Z comprising an OR gate (OR), AND gate (AN0-AN8) and switches (S0-S8) and output terminal (P3) while entering input terminal (B3) in the camera body as input signal.

The decoder (DE) activates the output terminal (D0) "High" every time the counter (CO) is advanced by 1. At the time, the switch (S0) of the setting switch means Z is opened, which opens the AND gate (AN0). Therefore, "High" output signal from the decoder output terminal (D0) passes the AND gate (AN0), the OR gate (OR), terminals (P3) and (B3), thereby transmitting "High" information to the camera body. When the counter is advanced to 2, the output terminal (D1) is made "High". The AND gate (AN1) of the setting switch means Z closes the gate because the switch (S1) is closed. Therefore, "High" output signal sent from the decoder output terminal (D1) cannot pass the gate, while transmitting "Low" information to the camera body. In the same way, information signals are sequentially and serially provided bit by bit, every time the clock pulse count is advanced.

Figure 3:
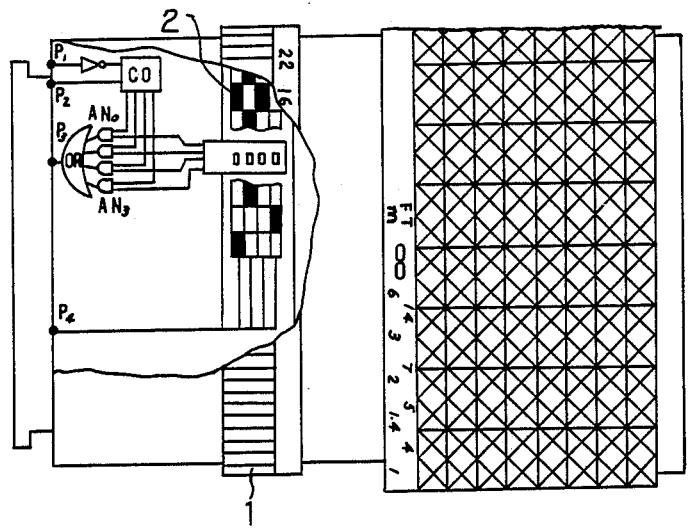
FIG. 3 is a diagrammatic illustration of an interchangeable lens arrangement in according with the present invention in which the diaphragm of the lens is used to transmit information to the camera body.

In the embodiment described above, the movable contact is shown as an example of the means for determining preset information with a view to more easy understanding. However, the present invention, is not limited only to such a method. For instance, when the diaphragm of an interchangeable lens is used to transmit information to camera body X, a device shown in FIG. 3 can be used; in which a diaphragm ring 1 and a code plate 2 are used as a switch for transmitting preset information, namely the number of diaphragm step to the camera body. The code plate 2 is interlocked with the diaphragm ring 1 for representing the number of diaphragm step from the full-open diaphragm position.

Figure 4:
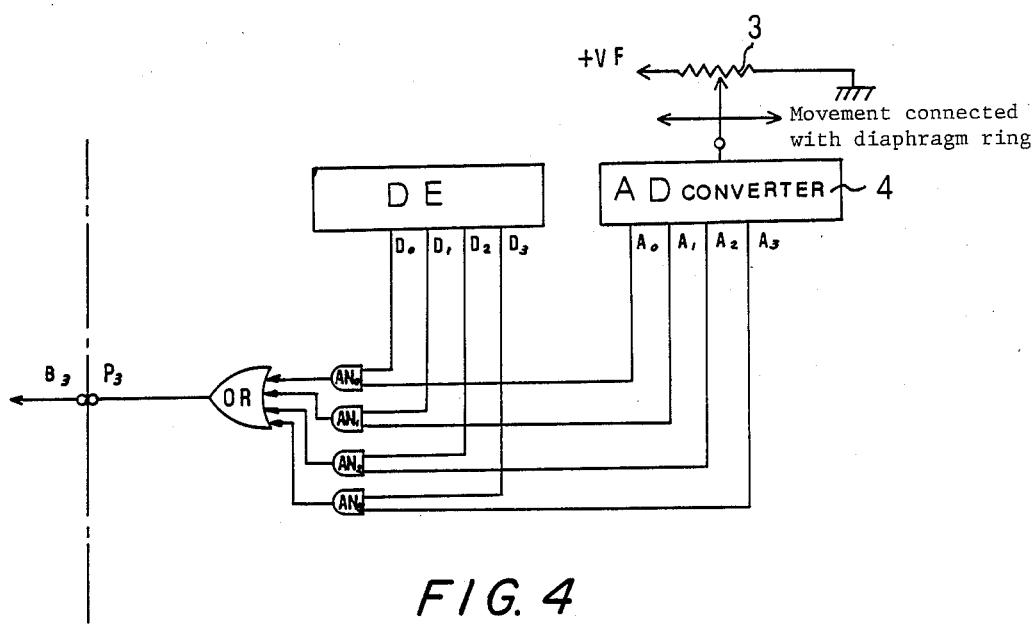
FIG. 4 is a block diagram, similar to FIG. 2, in which a slide resistor is employed interlockedly with the diaphragm ring of the lens arrangement of FIG. 3 instead of the code plate shown in FIG. 3.

Instead of such a switch using the code plate 2, a slide resistor 3 shown in FIG. 4 can be used interlockedly with the diaphragm ring 1. The resistor 3 generates the voltage output for representing the number of diaphragm step. Such an analog voltage is converted to digital value by the A/D converter 4 and then, based on converted digital value, AND gates (AN0-AN3), connected to the output signal line from the decoder output terminals (D0-D8) are opened. Thereby, "High" or "Low" information can be serially transmitted to the camera body.

The foregoing information relates to the number of diaphragm step which is manually set. In addition to manually settable information, there is fixed information exclusively to each lens, such as the open diaphragm value of the lens. Such fixed information can also be transmitted sequentially by closing the switch unit of the switch means using a short circuit piece, thereby, "High" or "Low" fixed information being sent to the camera body.

According to the embodiment of FIGS. 1 and 2, a counter (CO) and a decoder (DE) are used to construct an output means which sequentially transmits n output signals according to the clock pulses from the camera body. However, such an output can also be structured by a ring counter comprising the shift resistor.

Figure 5:
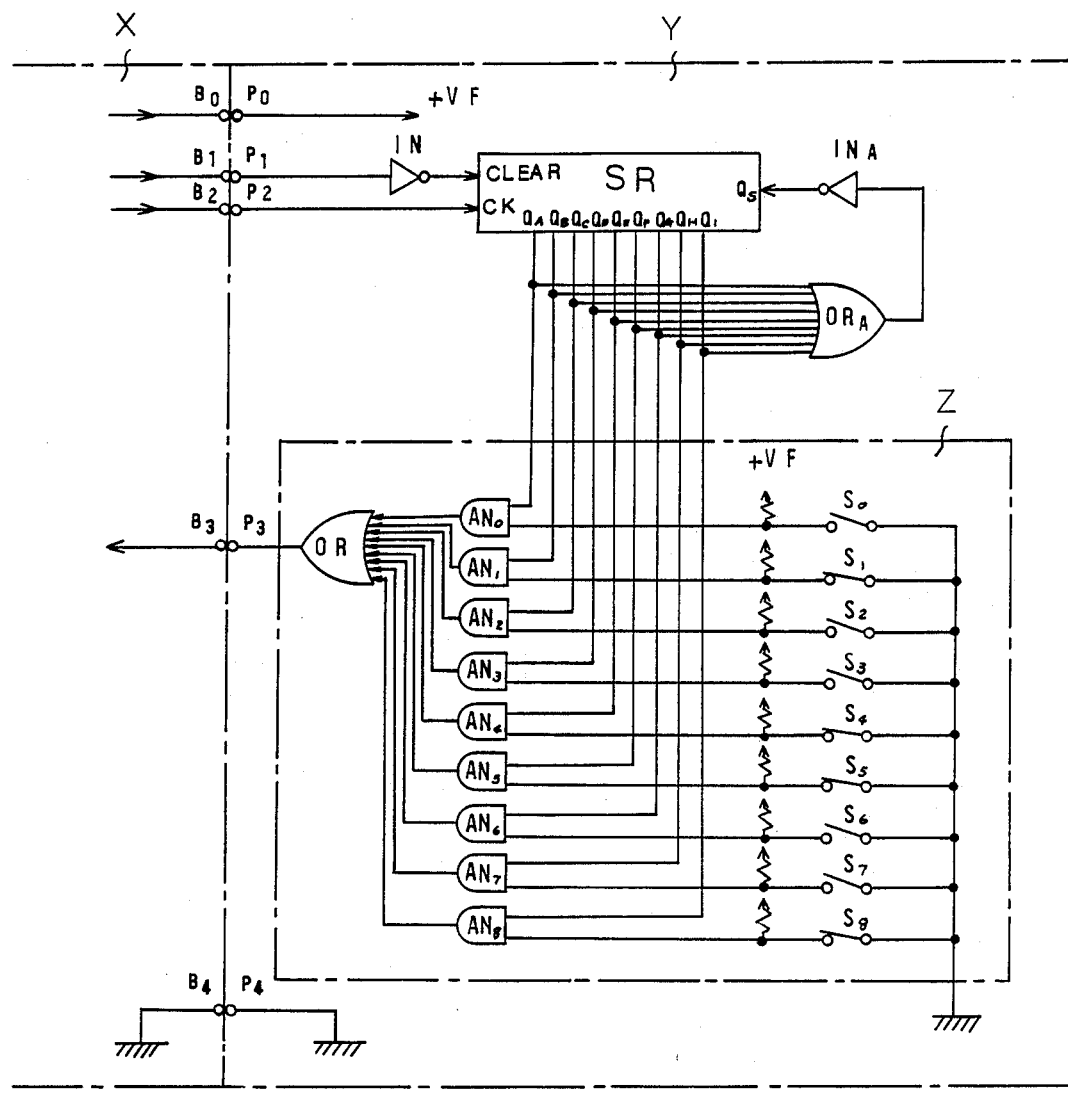
FIG. 5 is a block diagram, similar to FIG. 2, showing an alternative embodiment in which a ring counter is employed.

FIG. 5 shows such a configuration; in which when reset signal from terminal (P1) becomes "High", shift resistor (SR) is deactivated from reset status while making all outputs from output terminals (QA–Q1) of the shift resistor (SR) "Low". Meanwhile, "High" is applied to serial input terminal (QS) via OR gate (ORA) and inverter (INA).

In synchronization with the rising of clock pulse from clock pulse input terminal (P2), "High" signal output is applied to the output terminal (QA) of the shift resistor (SR). Synchronized with the next clock pulse, "High" signal output is applied to the output terminal (QB) of the shift resistor (SR). Such a signal output means can send signals sequentially to output terminals (QC–Q1) according to the clock pulses, in the same way as described before.

Thus, according to the present invention, a gate array is effectively used to determine whether n-lines output signals are to be output or not to the camera body according to the clock pulses sent from the camera body, thereby preset information being transmitted to the camera body without the need for addressing.

This invention does not incorporate an output system in which information of a fixed storage such as a ROM is transmitted. Therefore, no address data output circuit for a ROM is required, resulting in a simpler circuit configuration and lower cost. In addition, the circuit of the present invention can be structured only with logic circuits. Consequently, if gate array IC elements are used for the configuration, other effects such as small size and light weight can also be obtained. Furthermore, shorter developing time to mass production can be accomplished by introducing the gate array IC circuit elements than by using ROM and other fixed storage elements. Moreover, one type of output device can advantageously apply to various interchangeable lenses.

TABLE 1

| counter (CO) | | | | decoder (DE) | | | | | | | | |
|---|---|---|---|---|---|---|---|---|---|---|---|---|
| $C_0$ | $C_1$ | $C_2$ | $C_3$ | $D_0$ | $D_1$ | $D_2$ | $D_3$ | $D_4$ | $D_5$ | $D_6$ | $D_7$ | $D_8$ |
| 1 | 0 | 0 | 0 | H | L | L | L | L | L | L | L | L |
| 0 | 1 | 0 | 0 | L | H | L | L | L | L | L | L | L |
| 1 | 1 | 0 | 0 | L | L | H | L | L | L | L | L | L |
| 0 | 0 | 1 | 0 | L | L | L | H | L | L | L | L | L |
| 1 | 0 | 1 | 0 | L | L | L | L | H | L | L | L | L |
| 0 | 1 | 1 | 0 | L | L | L | L | L | H | L | L | L |
| 1 | 1 | 1 | 0 | L | L | L | L | L | L | H | L | L |
| 0 | 0 | 0 | 1 | L | L | L | L | L | L | L | H | L |
| 1 | 0 | 0 | 1 | L | L | L | L | L | L | L | L | H |

What is claimed is:

1. An output information system for an interchangeable camera lens accessory usable with a microprocessor based camera system for transmitting preset information to said microprocessor for use by said microprocessor in controlling the operation of the camera to which said lens is interchangeably attachable, said microprocessor being in said camera body, said microprocessor providing a clock pulse stream of n pulse in length to said camera lens accessory, said camera lens accessory comprising counter means for counting each of said n clock pulses transmitted from said microprocessor in a specific timing sequence, first pulse decoder means operatively connected to said counter means for decoding which pulse of said n pulse stream in said specific timing sequence is present and for selectively providing a corresponding predetermined logic high or low bit for a given potential output path from said first pulse decoder means in response to a predetermined clock pulse in said n pulse specific timing sequence clock stream, a condition responsive gate array operatively connected to a first portion of said given output paths for selectively receiving one of said corresponding logic high or low bits, and selectively calculating an output for said gate array for a given output path from said gate array based on the circuit configuration thereof for providing a first logic high or low serial output bit to said microprocessor through said condition responsive gate array circuit configuration in response to the condition of the inputs to a given gate in said gate array during said specific timing sequence of clock pulses in said n pulse stream; a second portion of said first decoder means output paths directly selectively providing a second logic high or low serial output bit to said microprocessor from said first decoder means in response to a different given clock pulse in said n pulse clock stream specific timing sequence; an output OR logic gate means having an input operatively connected in parallel to said gate array circuit configuration output paths and to said second portion of said first decoder means output paths for providing said n bit output pattern to said microprocessor from said OR logic gate means, said first portion of said first decoder means output paths being connected to said output OR logic gate means input through said gate array circuit configuration and said second portion of said first decoder means output paths being directly connected to said OR logic gate means input; whereby an n pulse serial clock stream specific timing sequence can be directly employed in a gate array circuit configuration to calculate a synchronized n bit serial bit output pattern to said microprocessor for controlling the operation of said camera without retrievable storage of lens information in said camera system.

2. An output information system in accordance with claim 1 wherein said lens accessory is an interchangeable zoom lens, said system further comprising a second decoder means for providing focal length information for said interchangeable lens and having output paths corresponding to each settable focal length of said interchangeable zoom lens, said output path being a logic high when said zoom lens is set at said corresponding focal length, said second decoder means output paths being operatively selectively connected to a different input of said corresponding gates in said condition responsive gate array circuit configuration for calculating a logic high output when said focal length is set at the time of said associated clock pulse in said n pulse stream specific timing sequence.

* * * * *